United States Patent [19]
Nagashima et al.

[11] Patent Number: 5,159,579
[45] Date of Patent: Oct. 27, 1992

[54] APPARATUS FOR ENCODING FISHFINDER IMAGE INFORMATION AND TRANSMISSION METHOD

[75] Inventors: Akira Nagashima, Nerima; Katsumasa Kajiwara, Fussa; Toshiro Akane, Setagaya, all of Japan

[73] Assignee: Kabushiki Kaisha Ryokuseisha, Tokyo, Japan

[21] Appl. No.: 775,748

[22] Filed: Oct. 15, 1991

[30] Foreign Application Priority Data

Apr. 16, 1991 [JP] Japan .................................. 3-110990

[51] Int. Cl.$^5$ ............................................ G01S 15/96
[52] U.S. Cl. ..................................... 367/111; 367/134
[58] Field of Search ................................ 367/111, 134

[56] References Cited
FOREIGN PATENT DOCUMENTS
63-59470 11/1988 Japan .

Primary Examiner—Daniel T. Pihulic
Attorney, Agent, or Firm—Oliff & Berridge

[57] ABSTRACT

When a signal from a calling device is received by a remote-located fishfinder, the fishfinder emits supersonic waves to a body of water below it and receives reflected waves from a fish shoal as an analog signal. Fish shoal information is expressed by the varying amplitude of the voltage of the signal. The analog signal is converted to Morse code form and sent to the calling device. The Morse signal received by the calling device is converted to the fishfinding information to be displayed. In the transmission procedure in the system of the present invention, analog signals of fish-shoal information are successively converted from analog to digital form. The signals are also converted to respective fish-shoal pulse signals divided on the basis of a given periodical synchronizing pulse and added. The fish-shoal information data are then sampled at predetermined intervals for a plurality of unit signal amplitudes determined along the time base. The data are ordered with bit units and stored in the memory. The sampled signals are converted to Morse code and the signals in the Morse code are transmitted together with synchronizing signals corresponding to the above-mentioned unit signals. The resulting transmission bandwidth is narrower in comparison with the conventional image transmission system and reduces the influence of noise when transmission distances are long.

3 Claims, 3 Drawing Sheets

APPARATUS FOR ENCODING FISHFINDER IMAGE INFORMATION AND TRANSMISSION METHOD

BACKGROUND OF THE INVENTION

1. Field of the Invention

The present invention relates to an apparatus for encoding fishfinder image information. The apparatus is used to transmit an image signal indicative of the condition of the sea below the apparatus from a comparatively remote place. The present invention also relates to a method for transmitting encoded information and a transmission system for transmitting a fishfinder image by using said transmission method.

2. Description of the Related Art

Two-dimensional image information has been transmitted to a remote place using a wire system as well as a wireless system. However, fishfinder image information representative of the presence of fish shoals in the sea below a detection device is generally transmitted from ships or buoys by using the wireless system. The so-called fishfinder image information is sufficient if it includes data indicative of the location of fish shoals and of the extent of the fish presence there. Thus, data relayed by the transmission system is not required to be highly accurate or at high speed, and, in practice, the information can be transmitted even in the form of a time-series analog signal.

In general, the so-called fishfinder emits a supersonic wave from a sound transmitter toward fish shoals in the sea below the emitter, receives a group of reflected waves from the sea bottom and the fish shoals, and displays the fishfinder image information on a CRT display unit and recording paper. The information indicative of the presence of fish shoals is of a two-dimensional format so that the brightness of each display spot varies. Thus, to transmit the information through a communication network or wireless system, the information must be converted into a one-dimensional format.

In the prior art, as shown in FIG. 8, the fishfinder image information is subjected to scanning and photoelectric conversion in an image transmitting device 1 so that it is converted from the two-dimensional format to the one-dimensional format. The fishfinder image information in the one-dimensional format is subjected to encoding and modulation in an image signal converting device 2 on the transmit side. After passing through a transmission network 3, the information is received in an image signal converting device 4 on the receiver side and subjected to demodulation and decoding so that it is converted from the one-dimensional format to the two-dimensional format. Finally, the information thus recovered is displayed as the fishfinder image information by an image receiving device 5.

In the image transmission of the above two-dimensional format, conventionally, the information of the fishfinder image is converted from analog to digital form and stored in a memory, then encoded per pixel (dot) before transmission. Therefore, since the information content of the fishfinder image becomes very large and dense, there is a need for a communication network having a very wide bandwidth and high speed and a system of high performance, as compared to the transmission in code form of character information.

Such a transmission system is susceptible to noise. To suppress the influence of noise, the use of a comparatively high frequency band, such as VHF or UHF, would be proposed; but, this limits the attainable distance of communications, increases facility costs and maintenance costs, and renders a transmission system bulky.

SUMMARY OF THE INVENTION

It is an object of the present invention to provide an apparatus for encoding fishfinder image information and a method for transmitting the encoded information, which makes it possible to transmit such information over a long distance with simplified facilities and low costs.

To accomplish the foregoing object, the present invention provides a transmission method for fishfinder image information which comprises the steps of emitting supersonic sound wave into the sea below the device; detecting wave, reflected from fish shoals in the sea below which are representative of the fishfinder image information, at certain times; successively converting the thus received signal from analog to digital form as well as converting it to respective fish-shoal pulse signals, which are classified on the basis of a synchronizing pulse having a predetermined cycle and storing these fish-shoal signals to a memory means; sampling the received signal held in the memory means several times to obtain image information segments, where each sampling of the fish-shoal information data is sampled for one of a plurality of unit amplitudes, where the segments are determined as a time basis of the unit amplitudes; storing the segment data in the memory means in such a manner that the data are ordered per bit units; converting a series of sampled signals into Morse code form; and transmitting the image information segments in the Morse code form together with a synchronizing pulses corresponding to the unit signals.

As will be appreciated, since the fishfinder image information is Morse-coded, the Morse-coding system comprising dots and spaces, the information can be transmitted in relatively less volume and can be reproduced into image information on the basis of synchronizing pulses, so that the frequency bandwidth of a communication network can be narrowed. Thus, the limitations of frequency bandwidth and distance as well as the increases of facility costs and maintenance costs and the increase in the transmission system can be avoided.

DESCRIPTION OF THE PREFERRED EMBODIMENT

An embodiment of the present invention will now be described with reference to the accompanying drawings.

Figure 1:
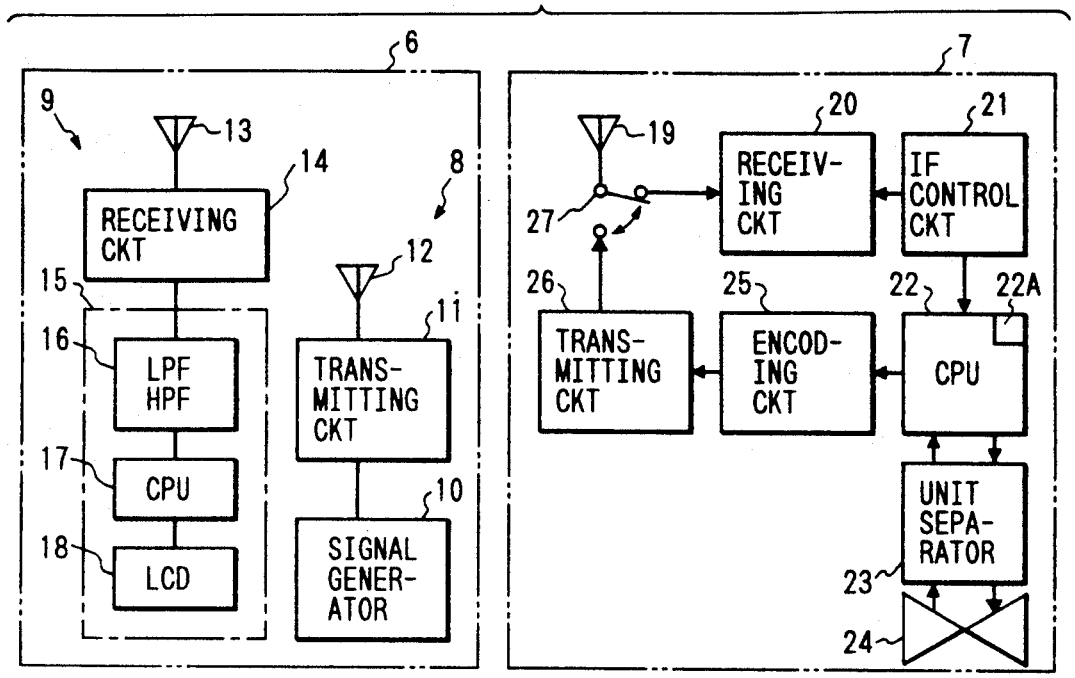
FIG. 1 is a block diagram showing an embodiment of the present invention.

FIG. 1 shows an apparatus for implementing the method of the present invention. This apparatus comprises fundamentally a calling device 6 and a fishfinder 7 having remote-control system. The calling device 6 comprises a signal generating section 8 and an image receiving section 9. The signal generating section 8 includes a signal generator 10 and a transmitting circuit 11. The signal generator 10 generates a call signal peculiar to each calling device 6, this call signal being input into the transmitting circuit 11. The transmitting circuit 11 modulates the call signal and sends out it to the fishfinder 7 through an antenna 12 in the form of a radio wave of predetermined frequency.

The image receiving section 9 includes an antenna 13, a receiving circuit 14, and a display block 15. The radio wave transmitted from an antenna 19 of the fishfinder 7 is received through the antenna 13 by the receiving circuit 14, and the fishfinder image information is displayed by the display block 15. The display block 15 includes a low-pass/high-pass filter 16, a CPU 17, a display unit 18, and a memory (not shown).

The memory is made of RAM and ROM (both not shown), the ROM holding therein the procedure for demodulating the fishfinder image information, which is Morse-coded by and sent from the fishfinder 7, the procedure for controlling the calling device 6, and various data.

On the other hand, the fishfinder 7 emits a supersonic wave, on the basis of the signal from the calling device 6 into the sea below it, and receives a reflected wave, which reflects from a fish shoal, as an analog signals expressed by the amplitude in which voltage varies. The fishfinder 7 then transmits the analog signals to the calling device 6 as Morse-coded fish image information. For this purpose, the fishfinder 7 includes the antenna 19, a receiving circuit 20, an IF control circuit 21, a CPU 22, a unit separator 23, a sonic wave sensor 24, an encoding circuit 25, a transmitting circuit 26, and a memory 22A.

The memory 22A is made of RAM and ROM, the ROM storing the procedure for discriminating a calling signal transmitted from the calling device 6, the procedure for converting the fishfinder image information given from the sonic wave sensor 24 from analog to digital form and for successively sampling the image information in digital form (later described), the procedure for controlling the fishfinder 7, and various data.

The antenna 19 receives the radio wave sent from the antenna 12 of the calling device 6 and emits the image information output from the transmitting circuit 26 in the form of a radio wave. The receiving circuit 20 converts the radio wave received through the antenna 19 by means of switching into an electric signal and matched to the IF control circuit 21.

The IF control circuit 21 matches the received signal from the receiving circuit 20 and inputs it to the CPU 22. The CPU 22 successively executes each procedure held in the memory. These constituents comprise a receiving control means.

The unit separator 23 switches between the receiving and transmitting functions of the fishfinder 7. That is, when the fishfinder is in the receiving state, the contact of a switch 27 lies between the antenna 19 and the receiving circuit 20, whereas when it is in the transmitting state, the contact of the switch 27 lies between the antenna 19 and the transmitting circuit 26. In the initial state, the unit separator 23 causes the contact of the switch 27 to lie between the antenna 19 and the receiving circuit 20.

The unit separator 23 includes an oscillator circuit (not shown) for emitting a supersonic wave toward the sea below the apparatus, the oscillator circuit being capable of generating a pulse signal of 1024 bits. The oscillator circuit is driven in response to a control signal input from the unit separator 23 while the fishfinder 7 is performing the transmitting function.

The sonic wave sensor 24 detects a group of reflected waves produced when the supersonic wave generated by the oscillator circuit is reflected by the sea bottom, fish shoals and the like, and input the resulting detection signal to the unit separator 23.

The encoding circuit 25 converts a series of image information segments sampled in the CPU 22 into Morse code form, the resulting image information segments in Morse code form being applied to the transmitting circuit 26 together with a synchronizing signal.

The transmitting circuit 26 adds a frequency or signal peculiar to each fishfinder 7 to the input signal from the encoding circuit 25, and sends out the resulting image information together with the synchronizing signal through the antenna 19.

The operation of the foregoing system for transmission of the fishfinder image information will be described.

First, an operator controls the calling device 6 to generate the call signal, so that the fishfinder 7 discriminates a given call signal by means of its receiving circuit 20 and IF control circuit 21, and when all is in order, the received signal input through the IF control circuit 21 is input to the CPU 22.

When the CPU 22 inputs an actuation signal to the unit separator 23, the unit separator 23 causes the oscillator circuit to send out the supersonic wave toward the sea below. After a while, the sonic wave sensor 24 receives and detects a group of reflected waves. The received signals, which are representative of fish-shoal information and are analog signals, are input through the unit separator 23 to the CPU 22.

Figure 2:
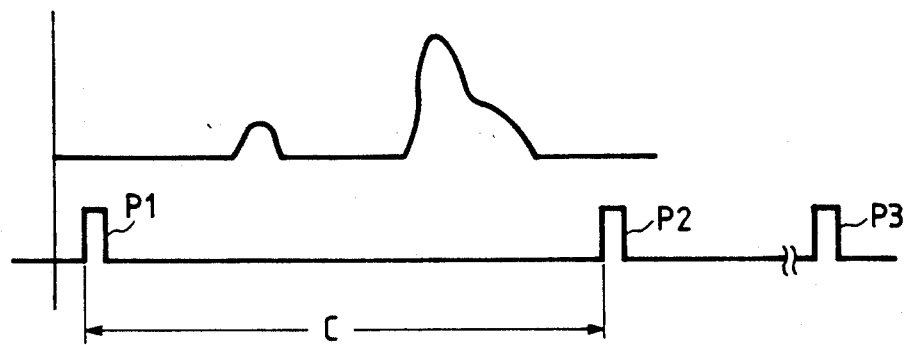
FIG. 2 is a diagram showing the fishfinder image information obtained by the fishfinder of FIG. 1.

The CPU 22 successively converts the received signals from analog to digital form and stores the resulting digital signal in the memory on a time basis T, this process being repeated sixteen times. As shown in FIG. 2, the image information representative of the reflected waves is converted into fish-shoal pulse signals, which are divided at predetermined intervals C as defined by synchronizing pulses P1 through P16. The resulting image information blocks are stored in the memory means together with the synchronizing pulses P1 through P16.

Figure 3:
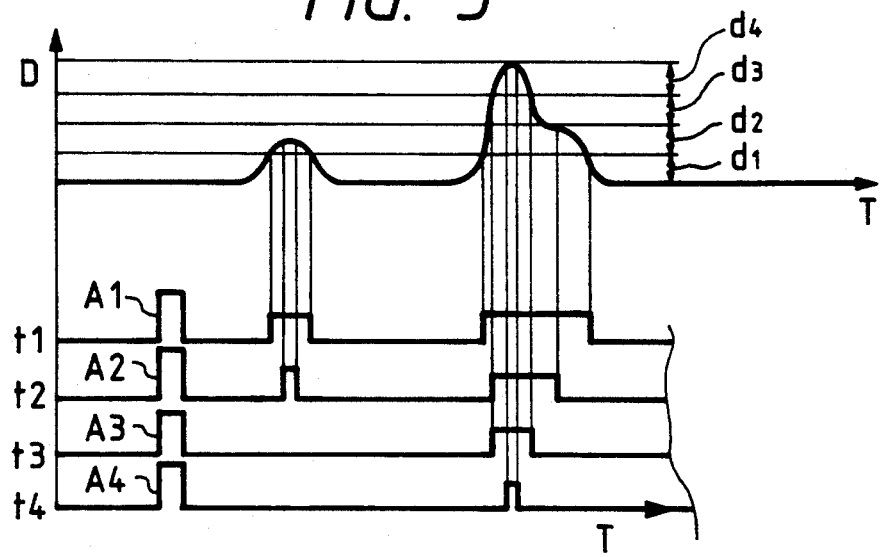
FIG. 3 is a diagram showing image information segments sampled in the fishfinder.

Then, the CPU 22 samples each image information block held in the memory four times. Each sampling uses one of a plurality of predetermined increments of a reference level d of the signal amplitude (corresponding to 8 bits=128 in value) (see FIG. 3, t1 through t4) to digitize the signal along the time base T. The thus sampled data (image information segment) are successively stored in the memory means starting with the MSB position. In this regard, to mark the data with the start and end points of each sampling, the CPU 22 stores each sampled data in the memory with bit units together with a corresponding synchronizing pulse, A1 through A4, corresponding to each sampling, t1 through t4.

Then, the encoding circuit 25 converts each image information segment plus each synchronizing pulse A1 through A4 (corresponding to a synchronizing pulse P1 through P16 of the fish shoal pulse signal) into Morse code form (including dots and spaces). The resulting image information in Morse code form is input to the transmitting circuit 26. It should be noted that since the image information plus the synchronizing pulses A1 through A4 are represented in the form of the Morse code, the width (voltage) of variation W of the signal is suppressed, whereby the frequency bandwidth of a communication network can be narrowed.

Then, the transmitting circuit 26 adds a radio wave of frequency or signal peculiar to each fishfinder 7 to the input signal from the encoding circuit 25, and sends out the image information segments of each pulse signal through the antenna 19 in the order of t1, t2, t3 and t4. Before this, of course, the unit separator 23 has caused the contact of the switch 27 to lie between the antenna 19 and the transmitting circuit 26 such that the fishfinder 7 has been in the transmitting state.

Figure 4:
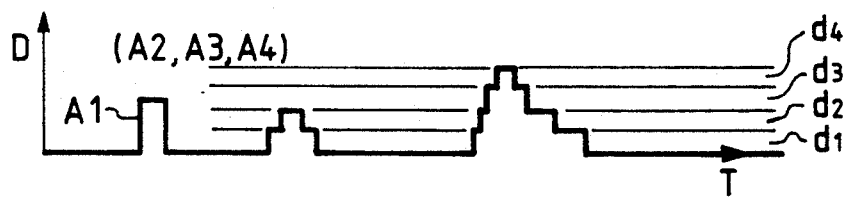
FIG. 4 is a diagram showing the fishfinder image information synthesized in the calling device of FIG. 1.

In the image receiving section 9, the receiving circuit 14 receives the image information segments of each pulse signal from the antenna 13 in the order of t1, t2, t3 and t4. Consequently, the image information segments ordered with the synchronizing pulse A1 through A4 (synchronizing pulses P1 through P16) are combined together as shown in FIG. 4 to recreate the pulse signal, and the thus synthesized fishfinder image information is displayed on the display unit 18.

Figure 5:
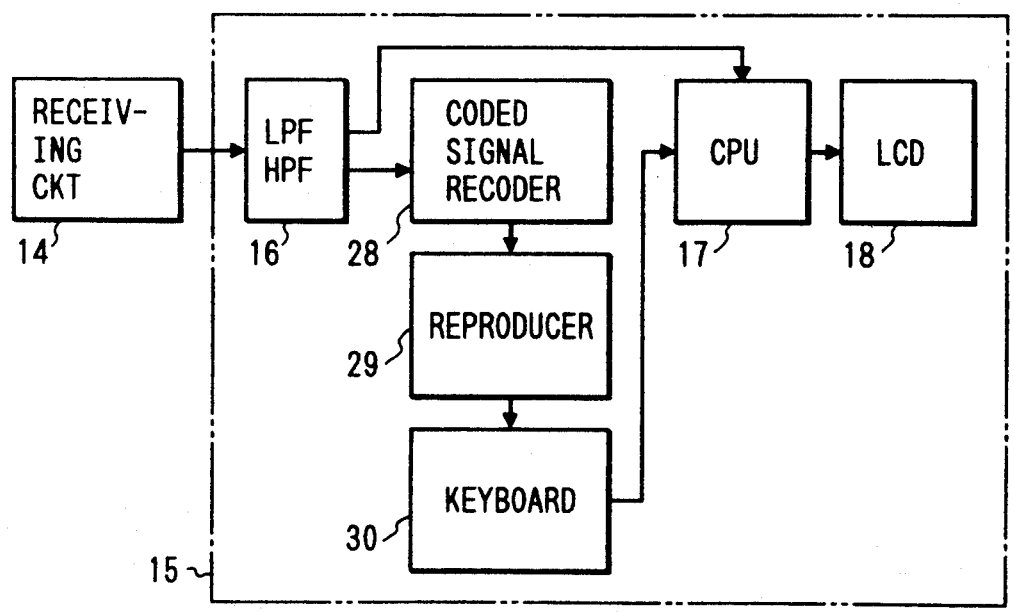
FIG. 5 is a block diagram showing a modification of the display block of FIG. 1.

Although the embodiment includes the image receiving section 9 for automatically actuating the display unit 18, the present invention should not be limited thereto. For example, as shown in FIG. 5, a coded-signal recorder 28, a reproducer 29, and a keyboard 30 may be connected to the filter 16.

Figure 6:
FIG. 6 is a diagram showing a part of the image information segment received in the calling device.

In this modification, as shown in FIG. 6, if the S/N ratio of the image information received in the receiving circuit 14 could not be improved, each image information segment received is recorded in the coded-signal recorder 28 before being synthesized in the CPU 17, reproduced by the reproducer 29, and made audible by a speaker or the like in the form of the Morse code (including dots and spaces).

Figure 7:
FIG. 7 is a diagram showing the image information segment corrected.
Figure 8:
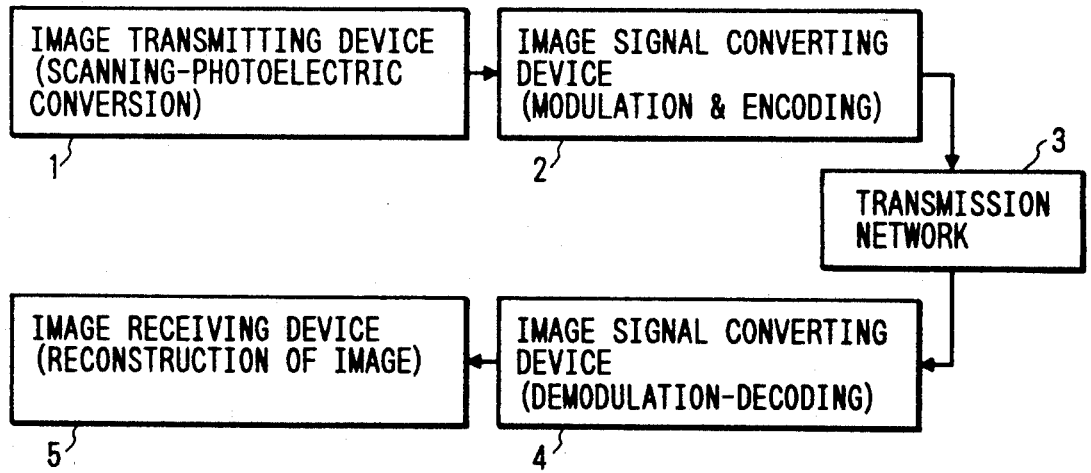
FIG. 8 is a block diagram showing a conventional system.

Specifically, where the image information has no good S/N ratio, the operator hears dots and spaces of the Morse code to determine their defectiveness and enters a correction signal through the keyboard 30 into the CPU 17. Then, each image information segment corrected as shown in FIG. 7 is synthesized in the CPU 17 in the manner shown in FIG. 4.

As described above, according to the present invention, the fishfinder image information is transmitted in the form of the Morse code (including dots and spaces) with a comparatively small information content, and the fishfinder image information is recovered from the Morse code on the basis of the synchronizing pulses A1 through A4; therefore, the frequency bandwidth of a communication network can be narrowed. Accordingly, limitations relating to the frequency bandwidth and the reachable distance of radio waves can be alleviated, facility costs and maintenance costs can be suppressed, and the system for implementing the method of the present invention can be made small in size.

What is claimed is:

1. A method for transmitting encoded fishfinding image information in a transmission system between a calling device and a remote-located fishfinder, comprising the steps of:
    emitting a supersonic wave into a body of water below the fishfinder;
    receiving a wave reflected from fish shoals in the body of water below the fishfinder at predetermined intervals;
    successively converting received signals from analog to digital form; converting the signals to respective fish-shoal pulse signals; classifying the pulse signals on the basis of a synchronizing pulse having a predetermined cycle; and storing these fish-shoal signals to a memory means;
    sampling the received signal held in the memory means a plurality of times to obtain image information segments, wherein each sampling of the signals is performed at a different reference level of signal amplitude, to determine the segments as a time period of the reference level; and storing the segment data in the memory means in such a manner that the data are ordered by synchronizing bit units;
    converting each series of sampled signals into Morse code form; and
    transmitting the image information segments in Morse code form together with the synchronizing pulses corresponding to the unit signals.

2. A transmission system for a remote-located fishfinder comprising a calling device and a fishfinder, said calling device comprising:
    transmitting means for transmitting a predetermined call signal for a selected fishfinder;
    receiving means for receiving fish-shoal information from the fishfinder as a Morse code signal; and
    display means for modulating the signal in Morse-code form to the fishfinding image information to be displayed; and
    said fishfinder comprising:
    receiving control means for receiving a predetermined call signal and executing procedures stored in a memory means;
    emitting means for emitting supersonic sound waves toward a body of water below the emitting means, to detect a fish shoal on the basis of the procedures;
    acoustic wave sensor means for detecting reflecting waves reflected from the fish shoal, sampling means for converting received waves detected by the acoustic wave sensor from analog to digital form such that the sampling means adds fish-shoal pulse signals divided at predetermined intervals, wherein the signals are divided on the basis of synchronizing signals so as to sample the added fish-shoal information signal at predetermined intervals over a plurality of unit amplitudes determined along the time base and to order the data with synchronizing bit units and store them in the memory means; and
    encoding means for converting the sampled signals to Morse code, and transmitting means for transmitting the signal in Morse code form together with synchronizing signals corresponding to the unit signals.

3. A transmission system for encoding and transmitting fishfinder information, comprising a remote transceiver unit and a base transceiver unit, wherein the remote unit comprises:

emitter means for emitting a supersonic sound wave into a body of water below the remote unit;

detecting means for detecting reflected sound waves, wherein the detector means detects the reflected waves at predetermined intervals;

digitizing means for digitizing the detected waves, wherein the digitizing means divides the detected waves into a plurality of fish shoal signals, and synchronizes the fish shoal signals;

sampling means for sampling the fish shoal signals, wherein the sampling means samples the fish shoal signals against a plurality of reference amplitude levels, and converts each fish shoal signal into a plurality of information segments;

memory means for storing the fish shoal signals and the information segments;

converting means for converting the information segments into Morse code signals; and receiving and transmitting means for receiving and transmitting information between the remote unit and the base unit; and wherein the base unit comprises:

receiving and transmitting means for receiving and transmitting information between the base unit and a plurality of remote units;

converting means for converting Morse code signals into information segments;

memory means for storing information segments and fish shoal signals;

adding means for combining a plurality of information segments into a single fish shoal signal; and display means for displaying at least one fish shoal signal.

* * * * *